(12) United States Patent
Hesse

(10) Patent No.: US 9,430,428 B2
(45) Date of Patent: Aug. 30, 2016

(54) CIRCUIT AND METHOD FOR SOFTWARE TRACING

(71) Applicant: Intel Deutschland GmbH, Neubiberg (DE)

(72) Inventor: Kay Hesse, Dresden (DE)

(73) Assignee: Intel Deutschland GmbH, Neubiberg (DE)

( * ) Notice: Subject to any disclaimer, the term of this patent is extended or adjusted under 35 U.S.C. 154(b) by 464 days.

(21) Appl. No.: 13/833,392

(22) Filed: Mar. 15, 2013

(65) Prior Publication Data

US 2013/0246676 A1    Sep. 19, 2013

(30) Foreign Application Priority Data

Mar. 16, 2012    (EP) .................................. 12159929

(51) Int. Cl.
*G06F 13/00* (2006.01)
*G06F 13/38* (2006.01)
*G06F 11/36* (2006.01)

(52) U.S. Cl.
CPC ........... *G06F 13/38* (2013.01); *G06F 11/3636* (2013.01); *G06F 11/3648* (2013.01)

(58) Field of Classification Search
CPC ... G06F 11/3644; G06F 13/36; G06F 13/362
USPC ................. 710/110, 300–306, 100, 316–317
See application file for complete search history.

(56) References Cited

U.S. PATENT DOCUMENTS

2008/0126871 A1   5/2008   Nardini
2009/0271553 A1*   10/2009   Gang et al. ................... 710/305

* cited by examiner

*Primary Examiner* — Tim T Vo
*Assistant Examiner* — Kim T. Huynh
(74) *Attorney, Agent, or Firm* — Schwegman Lundberg & Woessner, P.A.

(57) ABSTRACT

A circuit for software tracing in a system on chip is described as including a plurality of components, each component having at least one local processor connected to a first communication bus; and each component being connected to a second communication bus. The circuit may further include a separate trace data bus being configured to transmit trace data generated by code running on the components. A method associated with software tracing on such a circuit is also disclosed.

13 Claims, 5 Drawing Sheets

CIRCUIT AND METHOD FOR SOFTWARE TRACING

RELATED APPLICATIONS

This Application claims priority to European Patent Application Number 12159929.4, which is filed on Mar. 16, 2012. The entire contents of the European Patent Application are hereby incorporated herein by reference.

BACKGROUND

Large Systems-on-a-Chip (SOC) usually include several components that contain data processing units, together with a local controller, that perform some sort of defined task or sub-task. To perform the system task these local controllers interact with each other. This interaction in addition to the control of the component's data processing units, often based on interrupt handling, make the software for these controllers complicated. The system further may exhibit hard-to-debug behavior, e.g. deadlocks due to the fact that the processor interaction causes interdependencies. On the other hand, visibility into the system, the processor states, and software interaction is limited as observability is constrained by factors such as pin count, intra-chip bandwidth and power minimization. As a compromise between observability and the limiting factors often some form of software tracing is applied. This is basically a kind of "printf-debugging", where the software running on the different processors is explicitly sending status information to a dedicated trace interface that in turn provides means to collect data either in internal memory or off-chip. There are several, partly contradicting, goals for this:

- maximum visibility into software states
- flexible data payload (from simple "this procedure was started now" to copies of processed data)
- exact information about event time
- minimal impact on traced software
- no alteration of timing, both for local and for remote processors
- minimal code overhead
- minimal extra hardware resources
- minimal extra power consumption FIG. 1 shows a state-of-the-architecture, where trace data is sent over the same backbone bus system as functional data. The trace architecture is essentially a hierarchical star topology as it follows the data bus backbone. Trace data is generated by programs running on the component's local processors 12. It is then sent via the component's local crossbar 13 to a second-level crossbar 16 and a top level crossbar 19 to a trace interface block 17, which is basically an interface to either local memory or pins for off-chip data acquisition 18. The bus system is AHB (advanced high performance bus) and the crossbars AHB-multilayers, although other bus standards would work equally well.

Most functional data flow is contained within a component 111, 112 to 11x and thus travels only via the level 1 crossbar 113. Besides the local processor 12, each component includes a number of bus slaves 141, 142 to 14n, for example data processing blocks and may include one or more DMA engines 151, 152 to 15m. Only the processor 12 and the DMA engines 151, 152 to 15m are bus masters and can initiate data transfers. The data streams originating from the processor 12 and the DMA engines 151, 152 to 15m do not interfere with each other as long as they are targeting different bus slaves 141, 142, 14m like processing blocks or the port to the next level crossbar.

This current tracing approach has the advantage of not needing extra hardware resources to transport the trace data. However, there are also several drawbacks:

- Besides the inevitable timing impact on the traced program, i.e. simply by insertion of trace commands, there is an extra level of impact, caused by arbitration stalls, because several bus masters are competing for the path to the trace interface.
- Not only is the local program timing influenced, but also programs running on another processor, because trace data from one component can block the data path for functional data to/from another component.
- Addresses for write operations to the trace master are forwarded over the whole way from a processor to the trace master, causing power consumption for the address bus.

When trying to level the timing impact tracing has on a program, one method is to always sent trace data in shadow mode, not only in a debug scenario, so there is no timing difference for runs with normal or instrumented code. In a non-debug scenario trace data is then discarded at the trace interface. This, however, has a negative impact on power consumption as unnecessary data transfers are occurring on all levels of bus hierarchy.

Trace data is packetized and usually consists of more data than what can be transferred in a single bus transaction. Due to the star topology and because of the arbitration of data paths from the different processors to the trace interface, there is no guarantee that a trace data packet from a specific processor arrives in a continuous, uninterrupted stream at the trace interface. In order to ensure packet integrity, the trace interface master needs to contain trace context FIFOs and the appropriate control logic to first collect all packet data in one such FIFO before forwarding the trace packets to data acquisition. This is illustrated in FIG. 2 which shows a state-of-the-art trace interface master for star topology. Trace data arriving from a crossbar is allocated to one of the trace context FIFOs 231, 232 and 23n via multiplexer 24 and control 22 according to the processor the trace data originates from. The trace data of one processor of interest is then forwarded to data acquisition via multiplexer 25 and control 22.

Further, the number of trace context FIFOs is determined by the number of processors in the components and hence the trace master needs to be adjusted each time this number changes.

BRIEF DESCRIPTION OF THE DRAWINGS

The circuit and method according to the invention are described in more detail herein below by way of exemplary embodiments and with reference to the attached drawings, in which.

DISCLOSURE OF THE INVENTION

Figure 1:
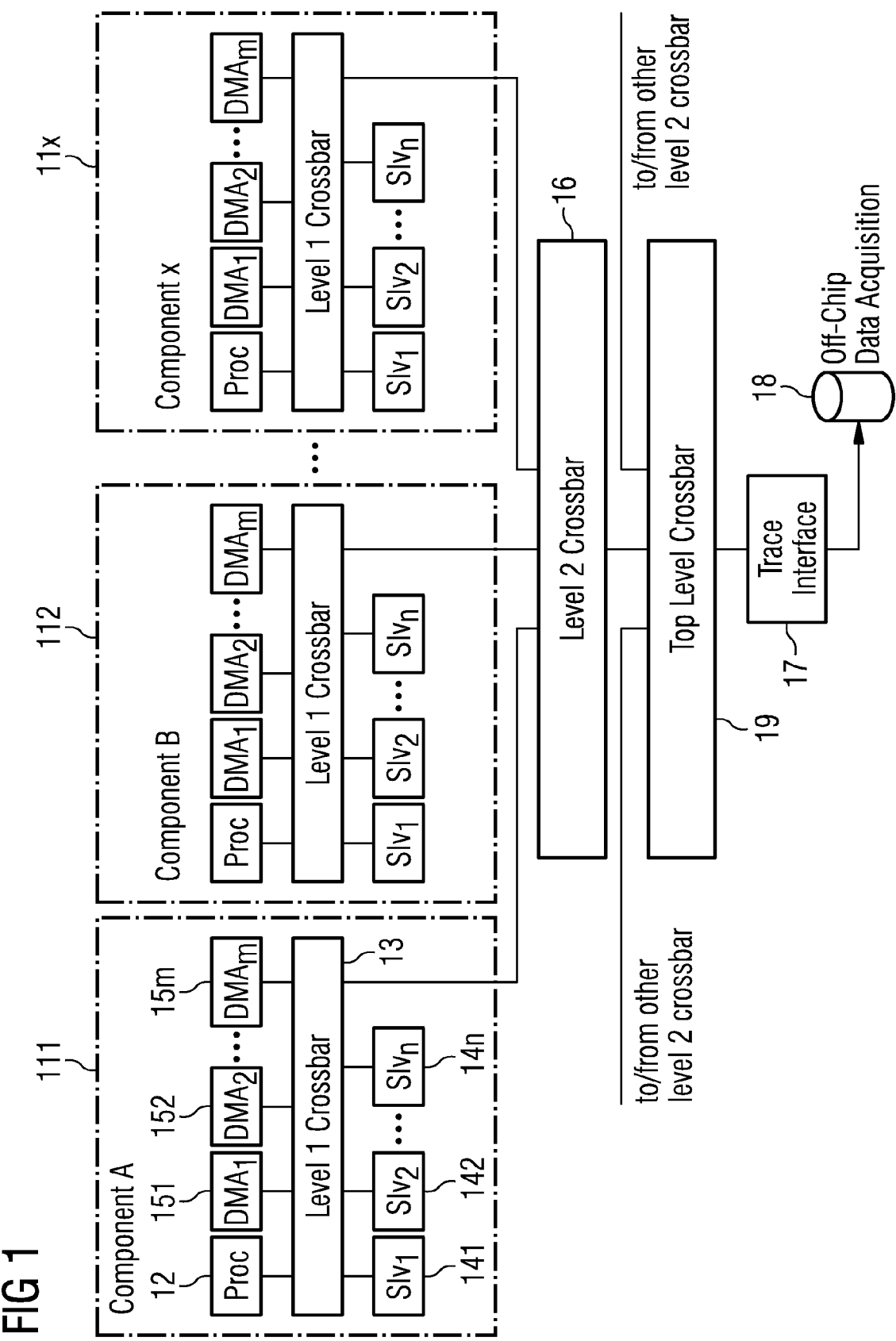
FIG. 1 shows block diagram of a state-of-the-art hierarchical star topology of a SOC.
Figure 2:
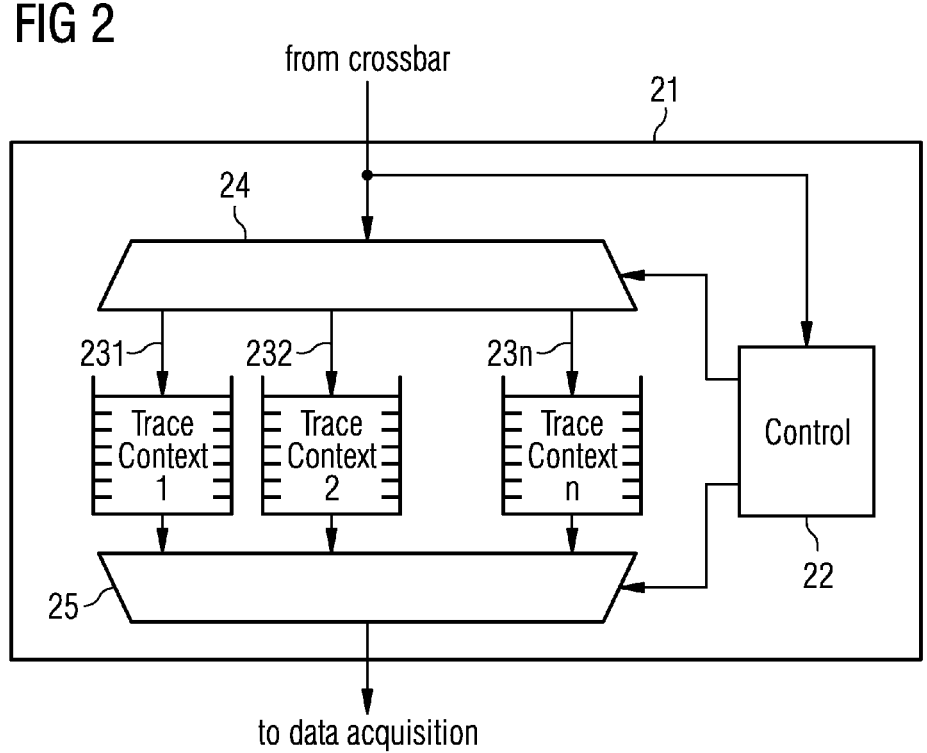
FIG. 2 shows a state-of-the-art trace master for a star topology.

In one implementation a circuit and related method for software tracing having an improved efficiency are disclosed.

A particular implementation relates to a circuit for software tracing in a system on chip comprising a plurality of components, each component comprising at least one local processor connected to a local communication bus; each component being connected to a global communication bus; wherein the circuit further comprises a separate trace data bus being configured to transmit trace data generated by code running on the components. Thus, trace data cannot collide with operational data generated by the processor or other elements of a component as a separate trace data bus is provided for transmission of the trace data. Furthermore, competition on the global communication bus is avoided with respect to trace data as trace data is no more transmitted along operational data along this bus. Moreover, trace data integrity can be guaranteed with the separate trace data bus and related protocol.

Yet another implementation relates to a ring-shaped trace data bus and its required additional circuitry. Each component may further comprise a trace slave module being configured to store, receive and transmit software trace data generated on the component. The trace slave module is connected to the local communication bus of a component. The circuit may further comprise a trace master module being configured to store, receive software trace data transmitted by the trace slave modules and being configured to transmit the software trace data to an external trace data interface. Trace slave modules and trace master module are connected by the trace data bus; wherein the trace data bus is ring shaped. Preferably the ring shaped trace data bus is implemented as a packet based SSL bus. Thus, trace data can be transmitted packetized by means of a simple transmission protocol not requiring addressing information as a recipient of trace data is always the trace master eventually. The slave modules discharge their stored trace data onto the ring before or after they have forwarded all trace data from their preceding slave.

In case the ring shaped trace data bus is implemented as SSL bus scheduling can be done by use of an authorization token that is issued by the master and circulates on the ring, wherein a slave owning the token is permitted to discharge its trace data onto the ring.

One implementation relates to the architecture of the trace slave modules. A slave module may comprise a ring input interface connected to the ring shaped trace data bus; a ring output interface connected to the ring shaped trace data bus; a trace data first in first out storage means connected to the local communication bus; a multiplexer and a control unit. The ring input interface and the trace data first in first out storage means are connected to the data input port of the multiplexer. The ring output interface is connected to the data output port of the multiplexer. The control unit is connected to the control port of the multiplexer and to the ring input interface. The control unit is configured to detect a trace data transmission authorization token within received trace data. In case the trace data transmission authorization token is detected the multiplexer is enabled by the control unit to pass trace data from the trace data first in first out storage means to the output interface. Otherwise, the multiplexer is enabled by the control unit to pass trace data from the trace data input interface to the trace data output interface.

It may be useful to discard trace data that is if no interest for debugging purposes, specifically if the software runs in shadow mode thus always producing trace data, as further transmission of trace data of no interest should be avoided due to power consumption aspects. Therefore, a trace slave module may comprise a trace data gate that is configured to discard trace data of no interest arriving from the local communication bus or to pass trace data of interest arriving from the local communication bus to the trace data first in first out storage means.

Another implementation relates to the trace master. The trace master may comprise a ring input interface, a ring output interface, a control unit, a trace data acquisition interface and a timer. The ring input is connected to the trace data acquisition interface and further connected to the control unit. The timer is connected to the control unit. The control unit is connected to the ring input output interface and configured to generate the trace data transmission authorization token and transmit it to the ring output. The generation of the trace data transmission authorization token may be done after receiving the trace data transmission authorization token of the preceding ring transmission or in specific time intervals determined by the timer. The control unit may be further configured to control the transmission of trace data to the trace data acquisition interface after receiving the trace data transmission authorization token of the current ring transmission.

An implementation further relates to a method for software tracing, wherein the trace data generated by the code running on the components is transmitted as a trace data stream on the trace data bus.

Furthermore, an implementation of a method relates to token based scheduling. In case the trace data bus is ring-shaped, any address-free scheduling protocol may be implemented on the trace data bus as the recipient of trace data is defined by the ring-shaped arrangement of slaves and master and thus no address information needs to be provided. The SSL protocol is preferred.

The trace master module controls trace data scheduling. The trace master injects a trace data transmission authorization token into the trace data stream. A trace slave module forwards all incoming trace data and drains its stored trace data into the trace data stream upon detection of the trace data transmission authorization token. The trace master module transmits the received trace data to the trace data acquisition interface upon detection of the trace data transmission authorization token.

The trace or scheduling protocol can be extended with a specific end marker token that can accumulate indications whether the slaves have been able to drain their FIFOs completely or not. This can then be used to launch the next start token based on necessity for further data transfer or only after a certain time has elapsed. This protocol extension provides a good means to balance power consumption, minimized by only launching data collection cycles at regular intervals, and avoidance of local FIFO overflows by ensuring earlier data collection when necessary.

The inclusion of the master time stamp into the start token also helps to minimize the amount of data transferred over the ring thus reducing power consumption, because it allows to transfer only the delta, i.e. the difference between the master time stamp and the local event time stamps, which can be done with a reduced number of bits, e.g. only 16 bits difference vs. 32 bit full time value. This works regardless of whether master and slave are clocked with the same frequency, because it is always possible to compute a global time reference.

It should be emphasized that the protocol described for the master does not require the master to know the number of attached slaves. For each slave the trace protocol appears the same, regardless of its position in the ring.

One aspect of the method relates to FIFO management.

The average fill rate for all slaves may be assumed uniform. Otherwise, a maximum fill rate can be calculated to configure the system.

Figure 6:
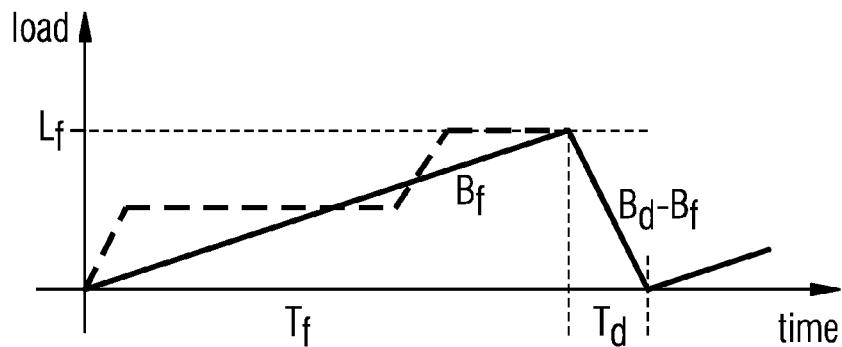
FIG. 6 shows a functional relationship of local FIFO load over time.

Locally, FIFO load behaves as shown in FIG. 6. During a certain period $T_f$, data is only filled into the FIFO with an average bandwidth of $B_f$. This is the interval between the arrival of the master's start token and the end of the local drain period. After the start token has been received, the FIFO is emptied with an average bandwidth of $B_d$-$B_f$ (the difference is because local trace data still keeps coming in even during the drain interval) during an interval $T_d$. This is illustrated in the figure with the solid line.

The dashed line illustrates a more realistic graph for FIFO load, where phases with incoming data at relative high bandwidth are followed by phases of no activity.

It is clear that $B_d$-$B_f$>$B_f$ should hold for the FIFO load to stay within a fixed limit. Further, during the period $T_f$ all other slaves are unloading their FIFOs on the ring, so the draining bandwidth $T_d$ must be at least N times higher than the filling bandwidth $T_f$ for N slaves. Apart from this condition, the filling interval and dependent on that the draining interval can be chosen freely. However, the longer the fill interval, the more data $L_f$ have to be kept in the local FIFOs until they are transported off. So, to minimize the FIFO size it is necessary to shorten the intervals for $T_f$.

There is another aspect, though, that may prevent the FIFOs from getting smaller than a certain minimal size. This aspect is packet integrity: In order to provide useful insight into the instrumented system, a certain minimum of information must be provided per trace event. Minimally, this is the event time and an event identifier. Usually, more payload is necessary, e.g. excerpts of data processed.

Hence, the generated trace data may be organized in packets and a trace slave drains its stored trace data when all packets belonging to one trace have been accumulated in a local FIFO. Thus, packet integrity is ensured as the authorization is passed to the next slave only in case the complete packet is drained. Hence, the local FIFO must at least be able to hold one packet of maximum size. This size can be chosen freely, but must be fixed at design time. However, if the local code would first write a smaller packet to its trace slave it could not continue with another packet until the FIFO was emptied, even if this would not exceed the allowed average fill bandwidth, the actual minimum FIFO size should at least cover two maximum packets.

Packet integrity may also requires for the slave to know the actual size of each packet it holds in its FIFO. So, the FIFO needs to be extended with some form of marker. This could be either a packet header, containing the size, a simple extra bit marking the beginning of a packet, or a second FIFO of smaller depth, containing only the sizes of the packets held in the actual data FIFO. Depending on the actual sizes of a minimal and a maximal packet, the second approach with the marker bits may require less extra bits than method one (header) or three (extra size FIFO). It is also important to understand that the instrumented code must actually provide somehow the size of the trace packet currently put into the FIFO. At the time when the trace packet is written into the FIFO, the code knows this size.

In order to convey this size to the trace slave the code may use different addresses in the trace slave's address space, e.g. via AHB, for first and intermediate writes and the final write, thus marking the end of the packet. In contrast to actual trace data being preceded or concluded by the size, i.e. a packet header or footer, trace code using different addresses in the trace slave's address space requires one write operation less; hence minimizing the timing impact on the traced code, and even avoids for the code to explicitly know the size of the trace packet because it only needs to mark the last write operation.

When the master token arrives at a trace slave, giving it the right to drain its local FIFO, the question arises how much data should be transported.

Preferably a number of packets, as long as their accumulated size is less than two maximum packets are to be transported.

Transporting all complete packets currently in the FIFO, in contrast, is suboptimal, because it may lead to a wide spread of the interval durations, depending on the distribution of packet generation between the different slaves and even within one slave over time. Consequently, this either requires bigger FIFOs to hold the worst case data amount or the danger of FIFO overflows and hence trace packet loss.

Transporting one packet, regardless of the size is also suboptimal because it poses the danger of starvation of one slave with a consequent packet loss. This can be seen in the following scenario: If there are two nodes in the system producing trace data with the allowed average data rate, but one node only producing big packets more seldom and the other node producing only small packets more often, the node with the small packets will not be able to unload all its data.

Therefore, transporting a number of packets, as long as their accumulated size does not exceed two maximum packets is to be preferred as this provides safe operation with regular intervals of filling/unloading and minimized FIFO sizes.

One aspect and implementation relates to the data transport. A trace slave may append its packets at the end of the trace data stream right before the end marker token after forwarding all received packets from previous slaves. Alternatively, a trace slave appends its own packets right after the trace data authorization token to the trace data stream before forwarding all packets received from previous slaves.

Figure 3:
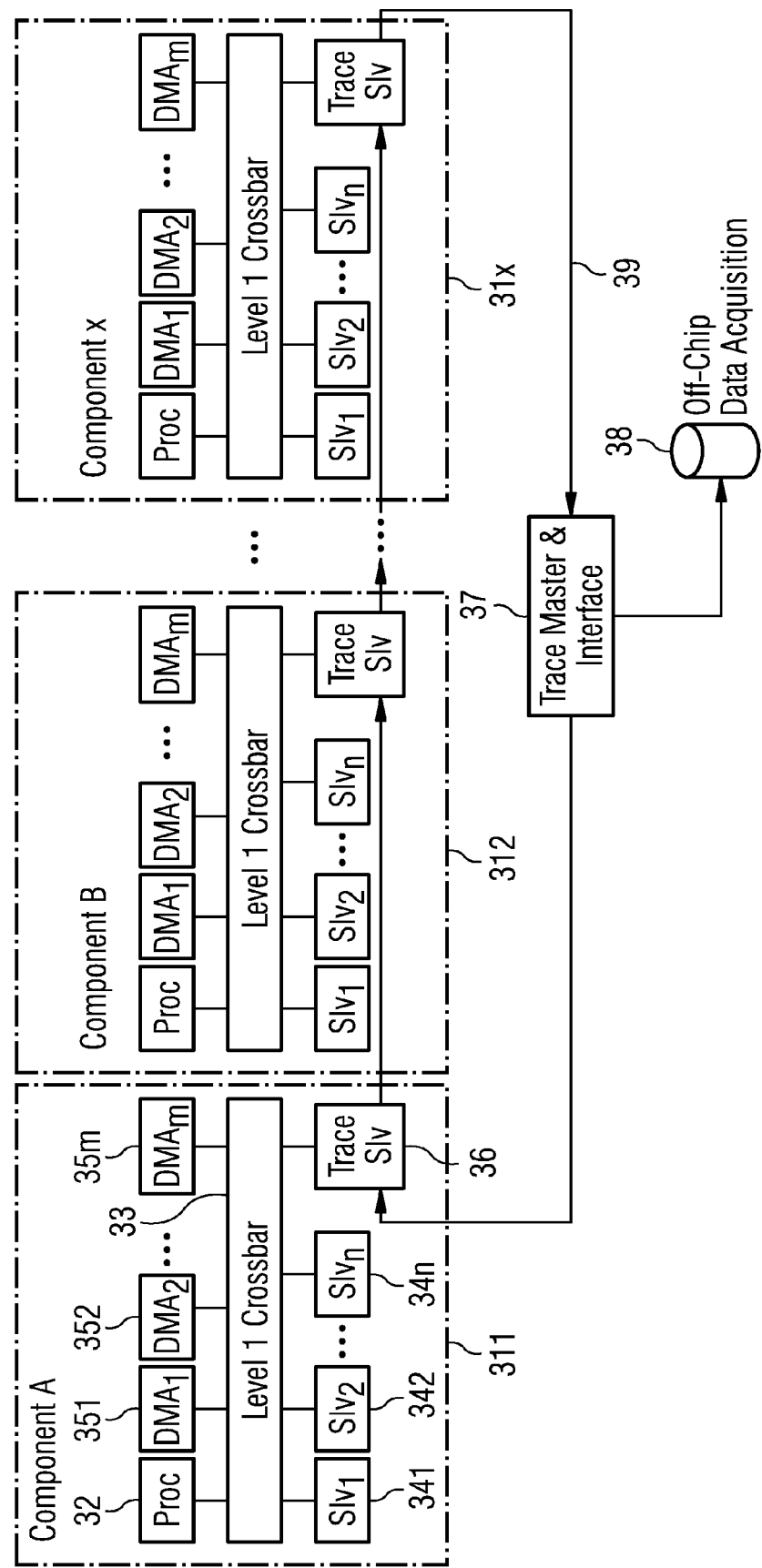
FIG. 3 shows a block diagram of SSL ring topology for trace data.

FIG. 3 shows an embodiment of the trace architecture using a ring topology for trace data. Operational data is still transferred via the hierarchical star topology of the backbone. Additional to processor 32, slaves 341, 342 to 34n and DMA engines 351, 352 to 35m each component 311, 312 to 31x now contains a local trace slave 36 connected to its local crossbar 33. These trace slaves 36 are further connected via an SSL ring 39 with their neighbors or the trace master 37, respectively. The trace master 37 still sits logically on top of the hierarchy and is connected to the data acquisition interface 38.

The separate SSL-ring 39 for the trace data avoids one disadvantage of the old approach: Trace data from one processor now cannot interfere anymore with operational data from another processor or even a local DMA engine. This limits the timing impact to only the inevitable local timing change caused by the trace commands in the processor's code.

Figure 4:
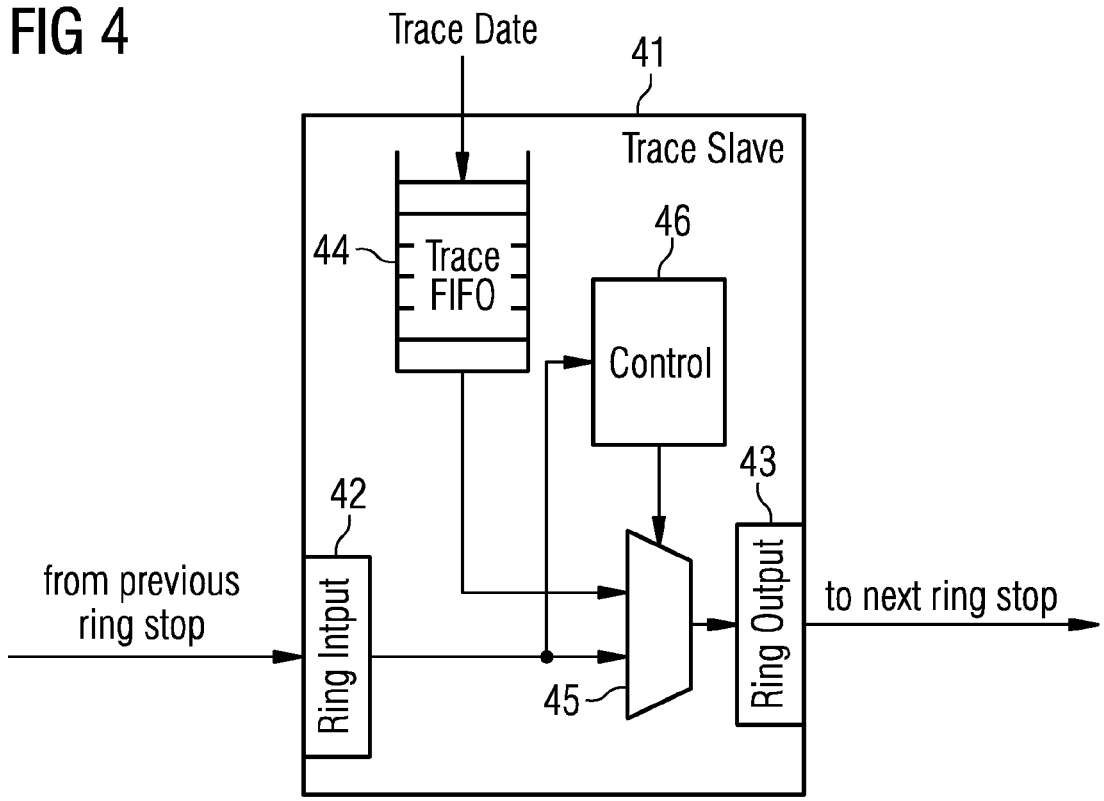
FIG. 4 shows a trace slave architecture.

The anatomy of a local trace slave is shown in FIG. 4. The main parts of the trace slave 41 are the SSL ports main ring input 42 and ring output 43. These are responsible for reception and transmission of data via SSL protocol. A FIFO 44 collects locally generated trace data until they can be sent to the next ring stop. A control block 46 is responsible for switching a multiplexer 45 between incoming data for forwarding and the local FIFO 44 for unloading its data based on a scheduling that will be described later.

Figure 5:
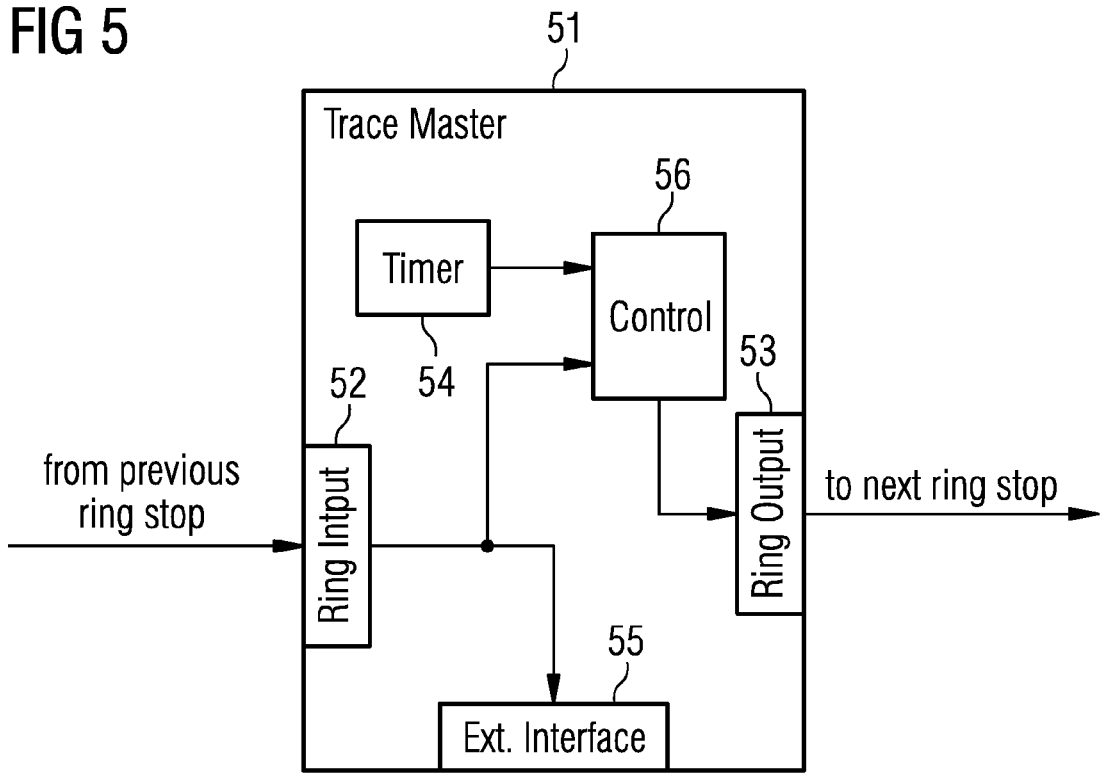
FIG. 5 shows a trace master architecture.

The anatomy of the trace master is illustrated in FIG. 5. The main parts of the trace master 51 are again the two SSL ports ring input 52 and ring output 53 for connecting to the first and last trace slaves in the ring. Further, there is an external interface 55 that sends the incoming trace data to external data acquisition equipment. Again, a controller 56 is responsible for the scheduling and is supported for that by a timer 54.

In one embodiment of the method the trace master 37, FIG. 3, controls the trace protocol or scheduling. In regular intervals it injects a token implemented as a special type of trace packet into the SSL ring 39. This token marks the beginning of a new cycle in which data is drained from the slaves' local FIFOs 44, FIG. 4. The token also contains the value of the master's timer when the token was started as a time stamp. When a slave 36 receives this token on its ring input 42, FIG. 4, then this gives the slave the right to drain a certain amount of data from its local FIFO into the ring 39, after or before it has forwarded all incoming data, i.e. the data following the token. The SSL protocol provides a convenient way of bundling all data into one contiguous stream by using the frame signal. The master 37 in turn recognizes its own token coming in via its ring input port and can then forward the payload data to the data acquisition interface 38.

Figure 7:
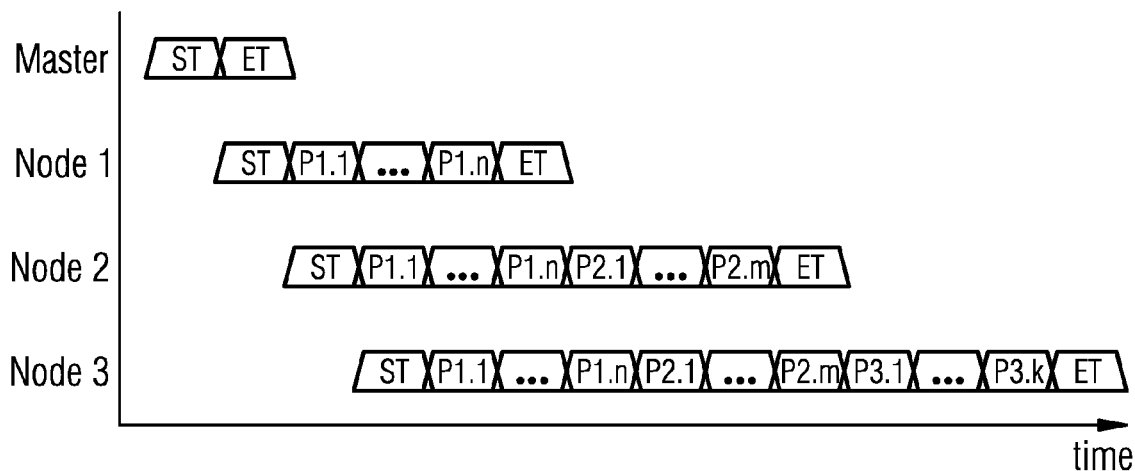
FIG. 7 shows a timing diagram for appending data transport.
Figure 8:
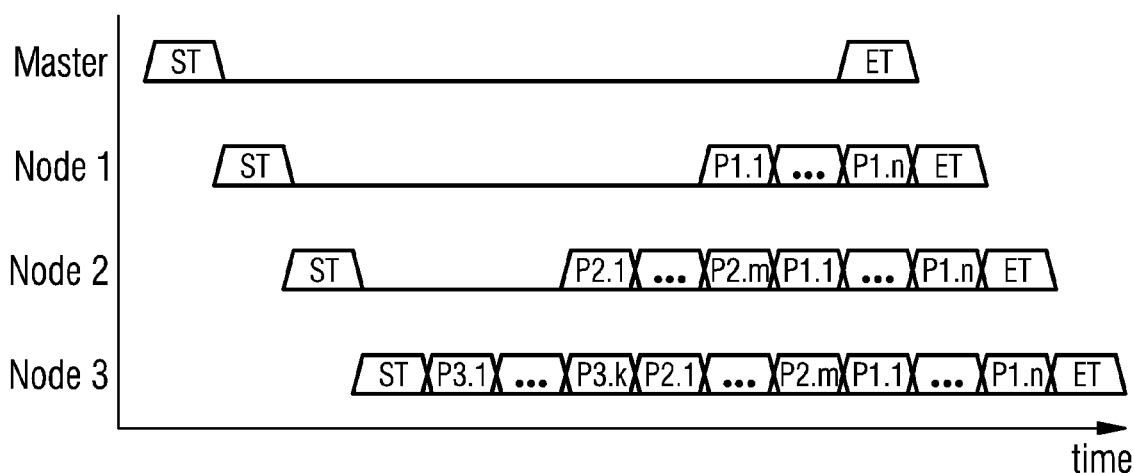
FIG. 8 shows a timing diagram for inserting data transport.

There are two possibilities for a slave to inject its trace packets into the stream of data passing through:
- append its own packets at the end of the stream right before the end token, after forwarding all packets received from previous slaves as shown for one embodiment of the method in FIG. 7,
- insert its own packets right after the start token before forwarding all packets received as shown for one embodiment of the method in FIG. 8.

Both methods are able to properly transfer all trace data and take the same period of time for the same amount of data, however, there are differences in the effect of data sequence and how the data flow needs to be controlled inside a slave. The following figures illustrate the effect on the data sequence. They show timing diagrams of one drain interval for a system that consists of 3 slaves, with a ring direction from master to node 1, from node 1 to node 2, from node 2 to node 3 and from node 3 back to master. <ST> indicates the start token, <Px.y> packet number y from node x and <ET> the end token.

In both cases the master initiates the transport by issuing the start token. Finally, after node 3, data are then coming back into the master.

In case of the appending data transport, the master also immediately issues the end token afterwards. From then on, the SSL ring acts like a packet pipeline. When node 1 receives the start token, it appends its own packets <P1.1> ... <P1.n> and finishes with the end token. At the next station in node 2, after reception of the start token, first all packets from node 1 are forwarded before appending own packets, followed by the end token. In node 3 the same thing happens:

Reception of start token, forwarding of all incoming packets, appending of own packets and finishing with the end token. In this transport method, data packets arrive at the master in the same sequence as the nodes have on the ring. The local control in the slave has to detect the end token and needs to temporarily store the end token, until it has forwarded all incoming packets (start token and data packets) and appended its own packets.

In case of inserting data transport, each slave stalls all previous nodes in the ring after reception of the start token, until it has forwarded its own packets. FIG. 8 shows the effect this has on both data sequence and timing. Only the last node in the ring before the master (in the example node 3) is able to continuously transfer data, first its own packets and then the incoming packets from previous nodes. For the previous node (node 2) this has the effect that after forwarding the start token it is stalled for the time the next node (node 3) takes to insert its packets, before it can continue to transfer both its own and further incoming packets. This stalling ripples through until the beginning of the chain and hence the master is stalled from sending out the end token, until all further nodes have inserted their data packets. In this method, data packets arrive in reverse order of the slave numbering (i.e. the packets from the last node before the master arrive first at the master), however, within the packets from one slave the sequence is still the natural order of events as these packets came from the slave's FIFO. The local control in the slave is a little bit simpler, because it only has to detect the start token, then switch the multiplexer to its local FIFO and after draining back to the ring input.

The new trace approach is based on a new combination of ring topology, token based access granting, packetized data formats and the SSL protocol. It is an advantage of the present invention that the impact on normal program timing is reduced, both locally in a node and remotely at other nodes.

It may be an advantage of an implementation that only small hardware overhead is required as SSL is lean and efficient. Furthermore, smaller FIFO sizes are necessary because of regular and predictable drain intervals. Moreover, the trace master architecture is independent of number of trace slaves, it doesn't even need to know the number.

It is yet another advantage of an implementation that power consumption for tracing is decreased because of two aspects. First, the SSL protocol avoids address transfer, so no power necessary for an address bus. Second, in shadow mode trace data can be disposed of already in the local slaves and don't need to be transferred to the trace master.

At least one implementation may provide further advantages such as minimized data redundancy through transfer of time differences with less bits than complete time stamps; easy scalability in number of trace slaves and bandwidth; and SSL allowing easy bandwidth scaling via clock frequency and/or data width.

While the invention has been illustrated and described in detail in the drawings and the foregoing description, such illustration and description are to be considered illustrative or exemplary and not restrictive. It will be understood that changes and modifications may be made by those of ordinary skill with the scope and spirit of the following claims.

The invention claimed is:

1. Circuit for software tracing in a system on chip, comprising:
   a plurality of components,
      each component comprising at least one local processor connected to a local communication bus;
      each component being connected to a global communication bus;
   wherein the circuit further comprises a separate trace data bus being configured to transmit trace data generated by code running on the components;
   wherein each component further comprises a trace slave module configured to store, receive and transmit software trace data generated on the component and being connected to the local bus of the component;

wherein the circuit further comprises a trace master module being configured to store, receive software trace data transmitted by a plurality of trace slave modules and being configured to transmit the software trace data to an external trace data interface;

wherein the trace slave modules and the trace master module being connected by the trace data bus; wherein the trace data bus is ring shaped, preferably implemented as packet based SSL bus; and wherein each of the trace slave modules comprises
- a ring input interface being connected to the ring shaped trace data bus;
- a ring output interface being connected to the ring shaped trace data bus a trace data;
- a trace data first in first out storage means being connected to the local communication bus;
- a multiplexer and a control unit;
- the ring input interface and the trace data first in first out storage means being connected to the data input port of the multiplexer;
- the ring output interface being connected to the data output port of the multiplexer;
- the control unit being connected to the control port of the multiplexer and to the ring input interface;
- the control unit being configured:
  - to detect a trace data transmission authorization token within received trace data;
  - in case the trace data transmission authorization token is detected, to enable the multiplexer to pass trace data from the trace data first in first out storage means to the ring output interface in case the trace data transmission authorization token is detected; and
  - to enable the multiplexer to pass trace data from the ring input interface to the ring output interface otherwise.

2. The circuit according to claim 1, wherein each trace data slave further comprises a trace data gate being connected to the trace data first in first out storage, the trace data gate being configured to either discard trace data or to pass trace data to the first in first out storage.

3. The circuit according to claim 1, wherein the trace master comprises a ring input interface, a ring output interface, a control unit, a trace data acquisition interface and a timer;

the ring input interface being connected to the trace data acquisition interface and being further connected to the control unit;

the timer being connected to the control unit;

the control unit being connected to the ring output interface and being configured to generate the trace data transmission authorization token and to transmit it to the ring output, preferably after receiving the trace data transmission authorization token of the prior transmission or after receiving a timing signal; and the control unit being further configured to control the transmission of trace data to the trace data acquisition interface after receiving the trace data transmission authorization token of the current ring transmission.

4. The circuit according to claim 1, wherein the trace data generated by the code running on the components is transmitted as a trace data stream on the trace data bus.

5. The circuit according to claim 1, wherein an address-free scheduling protocol is implemented on the separate trace data bus.

6. The circuit according to claim 1,
wherein the trace master module controls trace data scheduling by injecting a trace data transmission authorization token into the trace data stream;

wherein a trace slaves module forwards all incoming trace data and drains its stored trace data into the trace data stream upon detection of the trace data transmission authorization token; and wherein the trace master module transmits the trace data to the trace data acquisition interface upon detection of the trace data authorization token.

7. The circuit according to claim 6, wherein the trace master writes its master time stamp into the trace data transmission authorization token and wherein a slave writes the difference of its local time stamp and the master time stamp into the trace data transmission authorization token.

8. The circuit according to claim 6, wherein the trace master injects an end marker token and wherein a trace slave writes information regarding its remaining stored trace data that has not been yet drained to the end marker token and wherein the information is used to initiate a further trace data transfer on the ring shaped trace data bus or wherein a further trace data transfer on the ring shaped trace data bus is initiated after a certain amount has elapsed.

9. The circuit according to claim 1, wherein the generated trace data is organized in packets and a trace slaves drains its stored trace data when all packets belonging to one trace have been accumulated in a local first in first out storage means.

10. The circuit according to claim 9, wherein the size of each packet is provided to the local first in first out storage, preferably by a packet header containing the size or by a second first in first out storage means containing the sizes of the packets held in the first in first out storage means.

11. The circuit according to claim 10, wherein a different address in trace slave address spaces are used by local code running on a component for first, intermediate writes and a final write, thus marking and end of a packet, preferably via an advanced high performance bus.

12. The circuit according to claim 1, wherein upon receiving the trace data transmission authorization token a number of packets with an accumulated size that does not exceed two maximum packets are drained to the ring shaped trace data bus.

13. The circuit according to claim 8, wherein a trace slave appends its packets at the end of the trace data stream right before the end marker token after forwarding all received packets from previous slaves or wherein a trace slave appends its own packets right after the trace data transmission authorization token to the trace data stream before forwarding all packets received from previous slaves.

* * * * *